(12) United States Patent
Sadhu et al.

(10) Patent No.: US 11,518,546 B2
(45) Date of Patent: Dec. 6, 2022

(54) AIRCRAFT PERFORMANCE ANALYSIS SYSTEM AND METHOD

(71) Applicant: THE BOEING COMPANY, Chicago, IL (US)

(72) Inventors: Avik Sadhu, Bengaluru (IN); Seema Chopra, Bengaluru (IN); Kristoffer R. Jonson, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 433 days.

(21) Appl. No.: 16/783,707

(22) Filed: Feb. 6, 2020

(65) Prior Publication Data

US 2021/0245896 A1 Aug. 12, 2021

(51) Int. Cl.
*B64F 5/60* (2017.01)
*G06F 16/245* (2019.01)
*G07C 5/08* (2006.01)

(52) U.S. Cl.
CPC ............. *B64F 5/60* (2017.01); *G06F 16/245* (2019.01); *G07C 5/085* (2013.01)

(58) Field of Classification Search
CPC ......... B64F 5/60; G06F 16/245; G07C 5/085; G07C 5/008
See application file for complete search history.

(56) References Cited

U.S. PATENT DOCUMENTS

| 9,085,362 | B1* | 7/2015 | Kilian | B64F 1/027 |
|---|---|---|---|---|
| 9,459,620 | B1* | 10/2016 | Schaffalitzky | B64D 1/12 |
| 9,527,604 | B2* | 12/2016 | Melish | B64F 1/02 |
| 9,739,870 | B1* | 8/2017 | Beckman | G05D 1/0033 |
| 9,830,829 | B1* | 11/2017 | Doyen | G07C 5/008 |
| 10,155,587 | B1* | 12/2018 | Tang | B64D 47/02 |
| 2004/0176887 | A1* | 9/2004 | Kent | G07C 5/008 701/29.5 |
| 2006/0126608 | A1* | 6/2006 | Pereira | H04L 41/0866 370/360 |
| 2011/0064022 | A1* | 3/2011 | Curtin | H04L 45/00 370/328 |
| 2011/0288836 | A1* | 11/2011 | Lacaille | G05B 23/0254 703/2 |
| 2011/0313614 | A1* | 12/2011 | Hinnant, Jr. | G07C 5/0808 701/33.9 |
| 2016/0055685 | A1* | 2/2016 | Lilly | G07C 5/0808 701/1 |
| 2016/0196696 | A1* | 7/2016 | Pereira | G07C 5/008 701/31.4 |
| 2016/0364989 | A1* | 12/2016 | Speasl | G08G 5/0082 |
| 2017/0003689 | A1* | 1/2017 | Lee | G05D 1/0669 |
| 2017/0006417 | A1* | 1/2017 | Canoy | H04B 7/18506 |
| 2017/0129605 | A1* | 5/2017 | Wu | B05B 12/02 |
| 2017/0190420 | A1* | 7/2017 | Lee | H04W 12/06 |
| 2017/0197718 | A1* | 7/2017 | Buchmueller | B64C 17/00 |
| 2017/0197727 | A1* | 7/2017 | Kim | G06F 16/23 |

(Continued)

*Primary Examiner* — Mussa A Shaawat (74) *Attorney, Agent, or Firm* — The Small Patent Law Group LLC; Joseph M. Butscher (57) ABSTRACT

An aircraft performance analysis system and method include a performance analysis control unit that receives original performance model data, receives flight data from an aircraft, and determines a current performance model for the aircraft based on the original performance model data and the flight data.

23 Claims, 2 Drawing Sheets

(56) References Cited

U.S. PATENT DOCUMENTS

| | | | |
|---|---|---|---|
| 2017/0233105 A1* | 8/2017 | Vali | G06Q 10/06 |
| | | | 701/3 |
| 2018/0067502 A1* | 3/2018 | Chi-Hsueh | G08B 13/1965 |
| 2018/0186469 A1* | 7/2018 | Gregory | B64D 13/08 |
| 2018/0201371 A1* | 7/2018 | Kramer | B64D 1/16 |
| 2019/0147670 A1* | 5/2019 | Chopra | G07C 5/0808 |
| | | | 701/29.1 |
| 2019/0234233 A1* | 8/2019 | Ling | F01D 21/003 |
| 2019/0318596 A1* | 10/2019 | Pacella | G05D 1/0027 |
| 2020/0130866 A1* | 4/2020 | Srinivasan | G05B 23/0235 |
| 2020/0180791 A1* | 6/2020 | Kimberly | B64C 39/024 |
| 2020/0269995 A1* | 8/2020 | Beaven | G07C 5/008 |
| 2021/0024224 A1* | 1/2021 | Mohan | G07C 5/0808 |
| 2021/0122499 A1* | 4/2021 | Luobikis | B64D 45/00 |
| 2021/0139166 A1* | 5/2021 | Saito | B64F 5/60 |
| 2021/0192961 A1* | 6/2021 | Lebbos | G08G 5/0039 |

* cited by examiner

AIRCRAFT PERFORMANCE ANALYSIS SYSTEM AND METHOD

FIELD OF EMBODIMENTS OF THE DISCLOSURE

Embodiments of the present disclosure generally relate to aircraft performance analysis systems and methods that are configured to determine a performance model for an aircraft.

BACKGROUND OF THE DISCLOSURE

Aircraft transport passengers and cargo between destinations. Initial flight tests are conducted to determine operational performance of aircraft. Performance data from the flight tests is stored and a performance model for aircraft is stored and analyzed. The performance model is analyzed so as to determine desired flight characteristics of an aircraft.

Typically, a performance model is manually calculated using data from flight tests. In general, the performance model may be determined for a particular class of aircraft. For example, flight test data for a representative aircraft of a particular fleet is determined and used for analysis with respect to multiple aircraft of the fleet. That is, a common performance model is used in relation to all aircraft of a particular model.

As can be appreciated, however, as an aircraft ages, the aircraft may not operate the same as originally manufactured. For example, a ten-year old aircraft may not perform the same as it did during an initial flight. During the lifetime of an aircraft, the aircraft typically undergoes changes in relation to aerodynamics, propulsion, and the like for various reasons, such as repair, configuration changes, normal wear and tear, and the like. However, flight plans, characteristics, and the like are typically still determined based on the original performance model.

Moreover, specific aircraft within a particular fleet may perform differently than others. That is, each aircraft of a particular model differs from other similar aircraft. However, performance for each of these aircraft may still be based on a single performance model, which may or may not accurately reflect the performance of an individual, specific aircraft. A dated performance model that may not accurately reflect the performance of a particular aircraft may lead to unnecessary fuel burn due to sub-optimal speed schedules and flight planning.

SUMMARY OF THE DISCLOSURE

A need exists for a system and a method for determining a performance model for an aircraft that is updated based on operational history. Further, a need exists for a system and a method for providing an accurate, up-to-date performance model for a specific aircraft.

With those needs in mind, certain embodiments of the present disclosure provide an aircraft performance analysis system that includes a performance analysis control unit. The performance analysis control unit receives original performance model data regarding an original performance model for an aircraft, receives flight data from the aircraft, and determines a current performance model for the aircraft based on the original performance model data and the flight data. The current performance model is indicative of a current operational status of the aircraft.

In at least one embodiment, an original performance model database is in communication with the performance analysis control unit. The original performance model database stores the original performance model data.

In at least one embodiment, the performance analysis control unit receives the flight data from a flight computer of the aircraft.

In at least one embodiment, a current performance model database is in communication with the performance analysis control unit. The current performance model database stores current performance model data that includes the current performance model.

The original performance model may be determined through one or more flight tests.

In at least one embodiment, the original performance model includes original flight parameters including one or more of weight, altitude, airspeed during a test flight, and/or the like.

As an example, the performance analysis control unit determines the current performance model by updating the original performance model with current flight parameters. As another example, the performance analysis control unit determines the current performance model by replacing original flight parameters of the original performance model with current flight parameters.

In at least one embodiment, the performance analysis control unit updates the current performance model in response to each flight of the aircraft.

As one example, the performance analysis control unit includes a translation module that receives the flight data and translates the flight data into a form to be analyzed, a pre-processing module that filters the flight data, an optimization module that compares the flight data with baseline data, and a testing module that compares current flight parameters with original flight parameters.

Certain embodiments of the present disclosure provide an aircraft performance analysis method that includes receiving (by a performance analysis control unit) original performance model data regarding an original performance model for an aircraft, receiving (by the performance analysis control unit) flight data from the aircraft, and determining (by the performance analysis control unit) a current performance model for the aircraft based on the original performance model data and the flight data. The current performance model is indicative of a current operational status of the aircraft.

DETAILED DESCRIPTION OF THE DISCLOSURE

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide an aircraft performance analysis system and method that analyzes performance of an individual aircraft based on flight data provided from the aircraft. In at least one embodiment, the flight data from a recent flight (for example, a most recent flight) is compared to original performance model data for the aircraft. The original performance model data includes an original performance model for the aircraft. The original performance model may be determined from flight test data for the aircraft. The original performance model may be determined from a flight test for a representative aircraft other than the particular aircraft from which the flight data is received and analyzed. The flight data is compared in relation to the original performance model to determine a current (that is, up-to-date) performance model for the aircraft that is based on actual, up-to-date performance parameters for the specific aircraft, as opposed to an older performance model that may or may not directly relate to the specific aircraft. The current performance model may be used to provide future flight recommendations for the aircraft, such as desired or target flight parameters (for example, weight, altitude, airspeed, fuel type, and/or the like) that may be used to attain one or more performance goals, such as reduced fuel consumption, time of flight, and/or the like.

In at least one embodiment, the performance history for the aircraft is analyzed to develop a performance adjustment. The performance adjustment may then be applied in relation to the original performance model to provide a current performance model for the aircraft. The current performance model may be used to optimize performance according to one or more defined optimization variables.

In at least one embodiment, a performance analysis control unit receives flight data, such as from a flight computer and/or flight recorder of an aircraft, and performance model data determined from at least one flight test (such as conducted and determined by an aircraft manufacturer) to generate a continuously-adapting performance model for the aircraft. As such, embodiments of the present disclosure are configured to be used, for example, to provide accurate fuel mileage calculations and better model fleet performance, track individual tail specific performance (that is, performance of specific aircraft), and to identify performance inefficiencies in service, and so forth. The current performance model data for each aircraft (in contrast to a single, dated performance model applied to multiple aircraft) may be used to support fuel burn efficiency, and to more proactively update databases. Embodiments of the present disclosure are configured to actively monitor and process flight test data and current flight data to optimize aircraft trajectories and reduce fuel burn of aircraft through improving database predictions, thereby providing substantial cost savings.

Certain embodiments of the present disclosure provide an aircraft performance analysis system and method that actively monitors and processes flight test data and generates customized and optimal performance databases for multiple aircraft. The systems and methods allow for analysis of one or more recommended flight characteristics (such as recommended maximum airspeed, recommended cruising altitude, recommended rate of ascent and/or descent, and the like) for an aircraft so effects thereof can be fully comprehended before such flight characteristics are actually implemented. Embodiments of the present disclosure provide a performance analysis control unit that analyzes historical flight data and recommends improvements to a baseline performance model, which may thereby provide, for example, better speed schedules (the speed to fly commanded by the pilots) and fuel planning (fuel loaded onto the airplane), resulting in reduced fuel burn, and so forth.

In at least one embodiment, an aircraft performance analysis system includes a performance analysis control unit that receives original performance model data, such as baseline performance data for a particular aircraft model calculated with reference to a new or original condition of the aircraft. The performance analysis control unit further receives data from the aircraft for a set of flight legs, and determines adjustments to the baseline performance data based on baseline performance data and flight data, to generate corrected performance data customized for one or more aircraft. Current or corrected performance data is indicative of the current operational status of the aircraft.

In at least one embodiment, a flight management system of an aircraft automates a wide variety of in-flight tasks that includes critical functions like navigation, flight planning and performance. For the performance function, the flight management system uses algorithms, which may include performance models, and aerodynamic performance data stored in databases for real-time performance predictions and to optimize vertical navigation. The same performance databases may be used for all aircrafts of a particular model. However, individual aircraft of a particular model may be slightly different from each other; hence a single set of performance databases may not be optimal for all aircraft. For example, aircraft undergo changes in their aerodynamic and propulsion properties during their operating life due to various reasons like repair, configuration changes, or extent of use, and so forth. Currently, performance databases are not updated with aircraft age and operational history, and hence they may not capture the changes in the aerodynamic and propulsion properties of the aircraft. A method to constantly monitor the aircraft performance of one or more aircraft and generate adjustment tables whenever required may result in improved flying, which may in turn translate to, for example, cost savings and/or other benefits. Certain embodiments analyze recent flight data and may use physics-based recommendations to suggest adjustments to the original baseline performance database.

Figure 1:
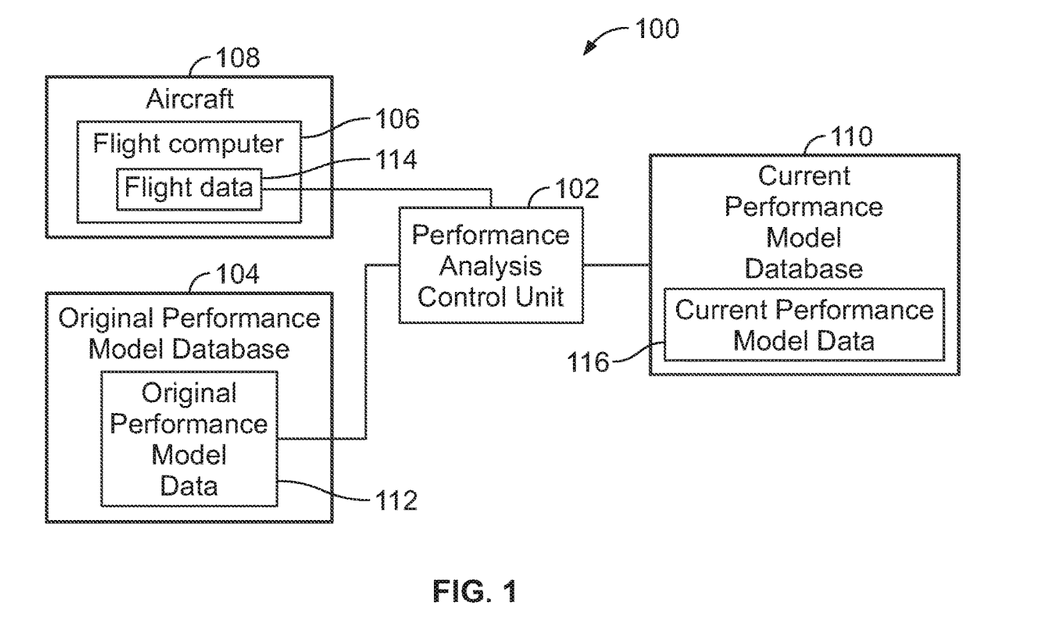
FIG. 1 illustrates a schematic block diagram of an aircraft performance analysis system, according to an embodiment of the present disclosure.

FIG. 1 illustrates a schematic block diagram of an aircraft performance analysis system 100, according to an embodiment of the present disclosure. In at least one embodiment, the aircraft performance analysis system 100 is configured to customize one or more databases. The aircraft performance analysis system 100 includes a performance analysis control unit 102 in communication with an original performance model database 104 (or original performance database), such as through one or more wired or wireless connections. The performance analysis control unit 102 may be commonly located with the original performance model database 104. In at least one other embodiment, the performance analysis control unit 102 is remotely located from the original performance model database 104. In at least one embodiment, the original performance model database 104 stores data related to aircraft performance, such as aerodynamic and propulsion data, which may be obtained from baseline data, and/or an original performance model.

The performance analysis control unit 102 is also in communication with a flight computer 106 of an aircraft 108, such as through wireless connections. For example, the flight computer 106 and the performance analysis control unit 102 may be in communication with each other through one or more of antennas, transceivers, internet communication, and/or the like.

In the embodiment shown in FIG. 1, the performance analysis control unit 102 is also in communication with a current performance model database 110 (or current or customized performance database), such as through one or more wired or wireless connections. The performance analysis control unit 102 may be commonly located with the current performance model database 110. In other embodiments, the performance analysis control unit 102 is remotely located from the current performance model database 110. In other embodiments, the current performance database 110 may be part of the performance analysis control unit 102. That is, the performance analysis control unit 102 may include the current performance model database 110, such as within a specific portion of memory.

The original performance model database 104 stores original performance model data 112. The original performance model data 112 includes information regarding the original performance model for the aircraft 108. In at least one embodiment, the original performance model is determined through one or more flight tests applicable to the aircraft 108. The original performance model may be determined from a test aircraft that is separate and distinct from the aircraft 108. The test aircraft may have undergone one or more flight tests, such as determined by a manufacturer, in generating the original performance model.

The original performance model includes original flight parameters. In at least one embodiment, the original flight parameters include weight, altitude (such as cruising altitude), airspeed, electrical and hydraulic features of one or more engines during the test flight, and/or the like. The original performance model provides information regarding how the test aircraft performed during a flight, thereby providing information for the same flight parameters for flights of the aircraft 108. That is, by providing the original performance model, operators of the aircraft 108 are able to determine various parameters (such as desired airspeed, desired cruising altitude, desired rate of ascent, desired rate of descent, and the like) in order to optimize particular desired goals, such as reducing fuel burn, reducing time of flight, and/or the like. The original performance model may or may not be indicative of how the aircraft 108 is currently operating. For example, the original performance model may have been determined from a test flight of a different test aircraft, which may operate differently than the aircraft 108. Further, the original performance model may have been determined long before the current date of operation of the aircraft 108. For example, the original performance model may have been determined 1, 2, 5, or more years before the current date of operation of the aircraft 108.

Accordingly, in addition to receiving the original performance model data 112 from the original performance model database 104, the performance analysis control unit 102 also receives flight data 114, such as from the flight computer 106 (which may include a flight recorder, or the flight data may be received from a separate flight recorder) of the aircraft 108. The flight data 114 includes current flight parameters (which correspond to the original flight parameters within the original performance model data 112) for the aircraft 108 as currently operating. For example, performance analysis control unit 102 may receive the flight data 114 from the flight computer 106 in real time as the aircraft 108 is operating during a flight. As another example, the performance analysis control unit 102 may receive the flight data 114 after a flight of the aircraft 108, such as when the aircraft 108 is at a gate of an airport. In at least one embodiment, the flight data, including the current flight parameters, is indicative of a current operational status of the aircraft 108, such as determined from a recent (such as the most recent) flight of the aircraft 108.

The performance analysis control unit 102 compares the current flight parameters of the flight data 114 with the original flight parameters of the original performance model data 112 to determine a current performance model for the aircraft 108. That is, the performance analysis control unit 102 determines the current performance model database 110 based on the flight data 114 from the aircraft 108 and the original performance model data 112. The current performance model may be stored as current performance model data 116, such as within the current performance model database 110.

As an example, the performance analysis control unit 102 uses the flight data 114 received from the aircraft 108 to update the original performance model data 112 to provide the current performance model, which may be stored in the current performance model database 110 as or part of the current performance model data 116. In this manner, the performance model for the aircraft 108 is based on the actual operational status of the aircraft 108, instead of the original performance model, which may be dated and/or determined based on an aircraft other than aircraft 108.

In at least one embodiment, the performance analysis control unit 102 determines the current performance model by updating the original performance model with the current flight parameters of the flight data 114. In at least one embodiment, the performance analysis control unit 102 determines the current performance model by replacing the original flight parameters of the original performance model with current flight parameters of the flight data 114.

The performance analysis control unit 102 may update the current performance model of the aircraft 108 in response to (for example, during or after) each flight of the aircraft 108. For example, during or after each flight of the aircraft 108, the performance analysis control unit 102 determines a current performance model for the aircraft 108 based on the flight data 114 received from the aircraft 108 in relation to the original performance model received from the original performance model database 104. In other embodiments, the performance analysis control unit 102 may update the current performance model after a predetermined number of flights (such as after every fifth, tenth, or twentieth) flight of the aircraft 108. The performance analysis control unit 102 determines the current performance model for the aircraft 108, which is representative of the actual and current operational status of the aircraft 108.

In at least one embodiment, the performance analysis control unit 102 compares the current flight parameters of the aircraft 108, as included within the flight data 114, with the original flight parameters, as included within the original performance model data 112. For example, the original flight parameters may be used to correlate the current flight parameters with respect to the current performance model database 110. The performance analysis control unit 102 may determine which flight parameters to include within the current performance model by reviewing the original flight parameters as contained within the original performance model data 112. In at least one embodiment, the performance analysis control unit 102 generates the current performance model for the aircraft 108 through the current flight parameters of the flight data 114. That is, the current performance model, which may be stored in the current performance model database 110, may include the current flight parameters of the flight data 114. In other embodiments, the performance analysis control unit 102 may retain original flight parameters from the original performance model if the current flight parameters are within a predetermined difference threshold (such as within 5% or less) of the original flight parameters. Thus, the current performance model may include at least some of the original flight parameters.

In at least one embodiment, the current performance history for the aircraft 108 as determined from the flight data 114 is analyzed by the performance analysis control unit 102 to develop a performance adjustment. The performance adjustment may be or include one or more current flight parameters, or may be the result of a comparison of the current flight parameters and the original flight parameters in relation to one or more predetermined difference thresholds. The performance adjustment may be applied in relation to the original performance model to provide the current performance model for the aircraft.

The current performance model, as determined by the performance analysis control unit 102, provides a current, up-to-date representation of the actual operational status of the aircraft 108, which may then be used to provide future flight recommendations for the aircraft 108, such as desired or target flight parameters (for example, weight, altitude, airspeed, fuel type, and/or the like) that may be used to attain one or more performance goals, such as reduced fuel consumption, time of flight, and/or the like. In this manner, the current performance model provides a current and accurate model for the aircraft 108 that may be used to accurately attain various performance goals.

By determining the current performance model for the aircraft 108 based on a current operational status of the aircraft 108 (as opposed to the original performance model), embodiments of the present disclosure allow for efficient and accurate flight plan recommendations that reduce fuel burn (on account of accurate, up-to-date data for a specific aircraft being used to determine the current performance model, in contrast to inaccurate speed schedules driven from inaccurate performance databases). Further, embodiments of the present disclosure may reduce a need for flight testing to substantiate relatively minor performance improvements, as the current performance model is based on the current operational status of the aircraft.

As described herein, embodiments of the present disclosure provide the aircraft performance analysis system 100 including the performance analysis control unit 102. The performance analysis control unit 102 receives the original performance model data 112, such as from the original performance model database 104, as well as the flight data 114 from the aircraft 108. The performance analysis control unit 102 compares the original performance model data 112 with the flight data 114, and determines the current performance model for the aircraft based on the original performance model data 112 and the flight data 114.

Figure 2:
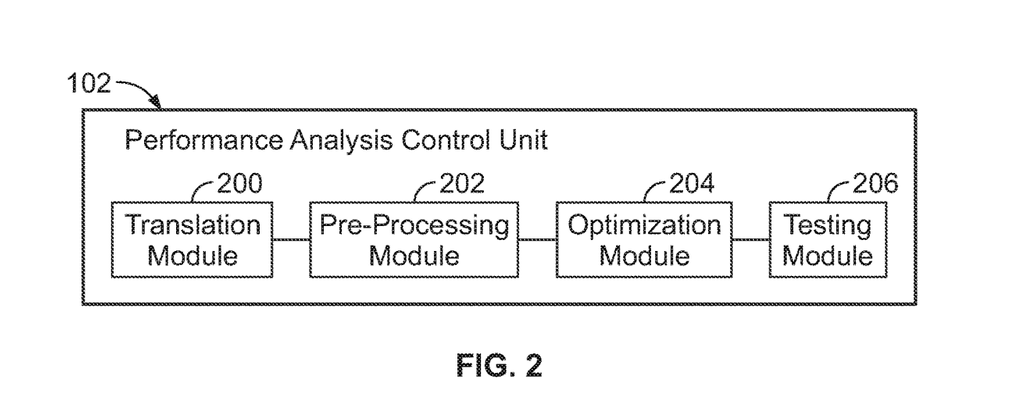
FIG. 2 illustrates a schematic block diagram of a performance analysis control unit, according to an embodiment of the present disclosure.

FIG. 2 illustrates a schematic block diagram of the performance analysis control unit 102, according to an example embodiment of the present disclosure. As shown, the performance analysis control unit 102 includes a translation module 200, a pre-processing module 202, an optimization module 204, and a testing module 206. The translation module 200, the pre-processing module 202, the optimization module 204, and the testing module 206 may be separate and distinct processors or circuits of the performance analysis control unit 102. In other embodiments, the translation module 200, the pre-processing module 202, the optimization module 204, and the testing module 206 may be part of a single processor or circuit. As another example, the functionality of the translation module 200, the pre-processing module 202, the optimization module 204, and the testing module 206 may be incorporated into a single circuit, processor, or the like.

The translation module 200 receives data and translates the data into a form to be analyzed. For example, referring to FIGS. 1 and 2, the translation module 200 receives the flight data 114 and converts the flight data 114 into a form that may be compared to the original performance model data 112, or vice versa.

The pre-processing module 202 filters the data, such as the flight data 114, such as by removing portions below and/or above predetermined acceptable values. For example, the pre-processing module 202 analyzes the flight data 114 to determine stable regions, and removes portions that are below and/or above predetermined threshold differences, in order to remove dips or spikes that may be anomalies. The pre-processing module 202 may interpolate missing values, detect outliers, filter, and the like in relation to received data. Further, the pre-processing module 202 may create derived parameters, such as mathematical combinations of measured parameters and lookup table data.

The optimization module 204 may compare the flight data 114 with baseline data. For example, the optimization module 204 may compare the flight data 114 to determine the flight parameters to optimize in relation to the original flight parameters.

The testing module 206 may compare the current flight parameters with the original flight parameters. The testing module 206 and/or the optimization module 204 may determine the current performance model based on the comparison of the current flight parameters with the original flight parameters.

It is to be understood that the performance analysis control unit 102 shown in FIG. 2 is merely exemplary. The performance analysis control unit 102 may include more or fewer modules than shown.

As used herein, the term "control unit," "central processing unit," "unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the performance analysis control unit 102 may be or include one or more processors that are configured to control operation thereof, as described herein.

The performance analysis control unit 102 is configured to execute a set of instructions that are stored in one or more data storage units or elements (such as one or more memories), in order to process data. For example, the performance analysis control unit 102 may include or be coupled to one or more memories (not shown). The data storage units may also store data or other information as desired or needed. The data storage units may be in the form of an information source or a physical memory element within a processing machine.

The set of instructions may include various commands that instruct the performance analysis control unit 102 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein illustrate one or more control or processing units, such as the performance analysis control unit 102. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include circuitry hardwired to perform the functions described herein. Optionally, the hardware may include electronic circuits that include and/or are connected to one or more logic-based devices, such as microprocessors, processors, controllers, or the like. Optionally, the performance analysis control unit 102 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Embodiments of the present disclosure provide systems and methods that allow large amounts of data to be tacked, and quickly and efficiently analyzed by a computing device. The vast amounts of data are efficiently organized and/or analyzed by the performance analysis control unit 102, as described herein. The performance analysis control unit 102 analyzes the data in a relatively short time in order to quickly and efficiently output a current performance model. A human being would be incapable of efficiently analyzing such vast amounts of data in such a short time. As such, embodiments of the present disclosure provide increased and efficient functionality, and vastly superior performance in relation to a human being analyzing the vast amounts of data. In short, embodiments of the present disclosure provide systems and methods that analyze thousands, if not millions, of calculations and computations that a human being is incapable of efficiently, effectively and accurately managing.

Figure 3:
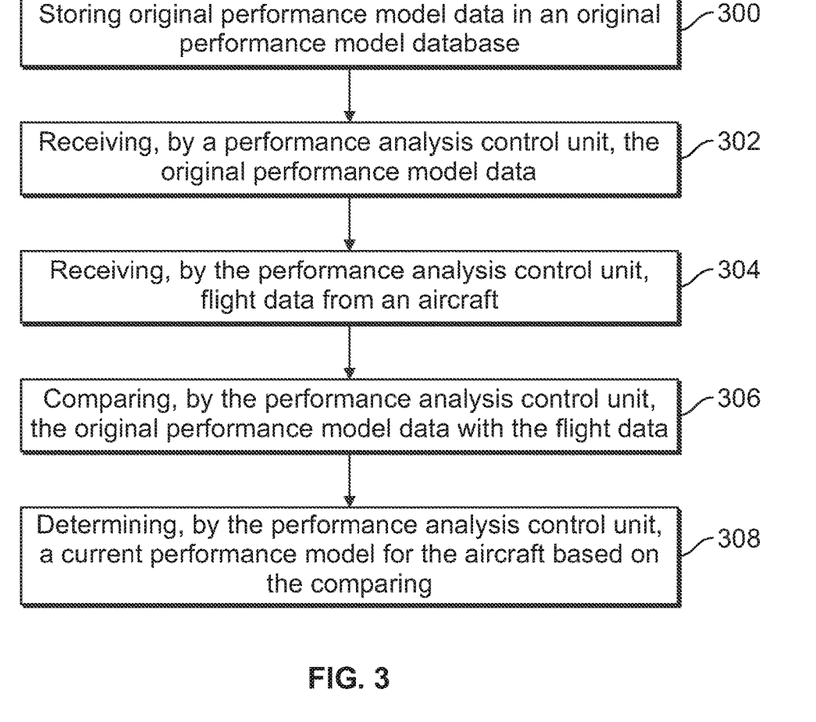
FIG. 3 illustrates a flow chart of an aircraft performance analysis method, according to an embodiment of the present disclosure.

FIG. 3 illustrates a flow chart of an aircraft performance analysis method, according to an embodiment of the present disclosure. Referring to FIGS. 1 and 3, the method includes, at 300, storing the original performance model data 112 in the original performance model database, and, at 302, receiving, by the performance analysis control unit 102, the original performance model data. The method also includes, at 304, receiving, by the performance analysis control unit 102, the flight data 114 from the aircraft 108. Next, the method includes, at 306, comparing, by the performance analysis control unit 102, the original performance model data with the flight data. The method also includes, at 308, determining, by the performance analysis control unit 102, the current performance model for the aircraft based on the comparison in 306.

Figure 4:
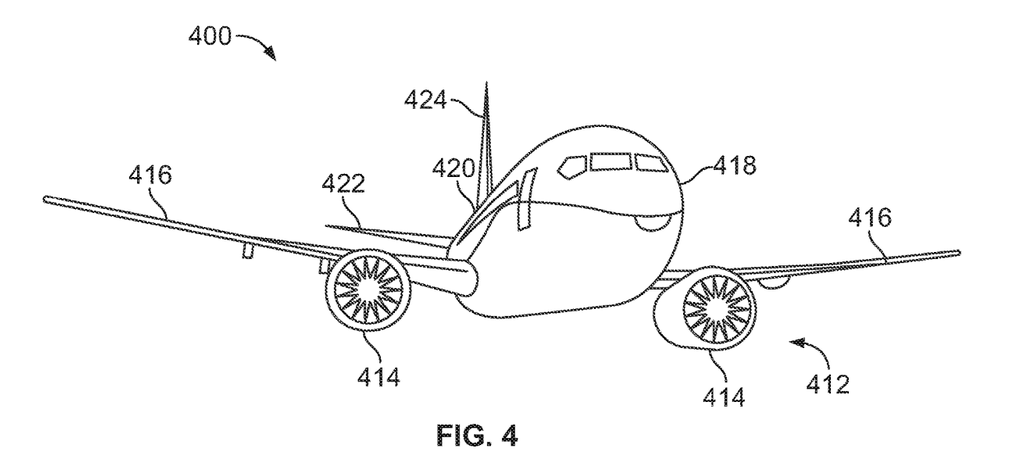
FIG. 4 illustrates a perspective front view of an aircraft, according to an embodiment of the present disclosure.

FIG. 4 illustrates a perspective top view of an aircraft 400, according to an embodiment of the present disclosure. The aircraft 400 is an example of the aircraft 108 of FIG. 1. The aircraft 400 includes a propulsion system 412 that may include two engines 414, for example. Optionally, the propulsion system 412 may include more engines 414 than shown. The engines 414 are carried by wings 416 of the aircraft 400. In other embodiments, the engines 414 may be carried by a fuselage 418 and/or an empennage 420. The empennage 420 may also support horizontal stabilizers 422 and a vertical stabilizer 424.

The fuselage 418 of the aircraft 400 defines an internal cabin. The internal cabin may include a cockpit, one or more work sections (for example, galleys, personnel carry-on baggage areas, and the like), one or more passenger sections (for example, first class, business class, and economy sections), and an aft section in which an aft rest area assembly may be positioned.

As described herein, embodiments of the present disclosure provide systems and methods for determining a performance model for an aircraft that is updated based on operational history. Further, embodiments of the present disclosure provide systems and methods for providing an accurate, up-to-date performance model for specific, individual aircraft.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An aircraft performance analysis system, comprising:
a performance analysis control unit, wherein the performance analysis control unit:
receives original performance model data regarding an original performance model for an aircraft,
receives flight data from the aircraft, and
determines a current performance model for the aircraft based on the original performance model data and the flight data, wherein the current performance model is indicative of a current operational status of the aircraft.

2. The aircraft performance analysis system of claim 1, further comprising an original performance model database in communication with the performance analysis control unit, wherein the original performance model database stores the original performance model data.

3. The aircraft performance analysis system of claim 1, wherein the performance analysis control unit receives the flight data from a flight computer of the aircraft.

4. The aircraft performance analysis system of claim 1, further comprising a current performance model database in communication with the performance analysis control unit, wherein the current performance model database stores current performance model data that includes the current performance model.

5. The aircraft performance analysis system of claim 1, wherein the original performance model is determined through one or more flight tests of a test aircraft that differs from the aircraft.

6. The aircraft performance analysis system of claim 1, wherein the original performance model comprises original flight parameters including one or more of weight, altitude, or airspeed during a test flight of a test aircraft that differs from the aircraft.

7. The aircraft performance analysis system of claim 1, wherein the performance analysis control unit determines the current performance model by updating the original performance model with current flight parameters.

8. The aircraft performance analysis system of claim 1, wherein the performance analysis control unit determines the current performance model by replacing original flight parameters of the original performance model with current flight parameters.

9. The aircraft performance analysis system of claim 1, wherein the performance analysis control unit updates the current performance model in response to each flight of the aircraft.

10. The aircraft performance analysis system of claim 1, wherein the performance analysis control unit comprises:
a translation module that receives the flight data and translates the flight data into a form to be analyzed;
a pre-processing module that filters the flight data;
an optimization module that compares the flight data with baseline data; and
a testing module that compares current flight parameters with original flight parameters.

11. The aircraft performance analysis system of claim 1, wherein the original performance model is determined from a flight test for a representative aircraft other than the aircraft from which the flight data is received.

12. The aircraft performance analysis system of claim 1, wherein the performance analysis control unit provides a future flight recommendation for the aircraft based on the current performance model, wherein the future flight recommendation includes target flight parameters used to attain one or more performance goals.

13. The aircraft performance analysis system of claim 12, wherein the one or more performance goals include reduced fuel consumption.

14. An aircraft performance analysis method, comprising:
receiving, by a performance analysis control unit, original performance model data regarding an original performance model for an aircraft;
receiving, by the performance analysis control unit, flight data from the aircraft; and
determining, by the performance analysis control unit, a current performance model for the aircraft based on the original performance model data and the flight data, wherein the current performance model is indicative of a current operational status of the aircraft.

15. The aircraft performance analysis method of claim 14, further comprising storing the original performance model data in an original performance model database in communication with the performance analysis control unit.

16. The aircraft performance analysis method of claim 14, wherein said receiving, by the performance analysis control unit, the flight data comprises receiving the flight data from a flight computer of the aircraft.

17. The aircraft performance analysis method of claim 14, further comprising storing current performance model data that includes the current performance model in a current performance model database in communication with the performance analysis control unit.

18. The aircraft performance analysis method of claim 14, further comprising determining the original performance model through one or more flight tests of a test aircraft that differs from the aircraft.

19. The aircraft performance analysis method of claim 14, wherein the original performance model comprises original flight parameters including one or more of weight, altitude, or airspeed during a test flight of a test aircraft that differs from the aircraft.

20. The aircraft performance analysis method of claim 14, wherein said determining comprises updating the original performance model with current flight parameters.

21. The aircraft performance analysis method of claim 14, wherein said determining comprises replacing original flight parameters of the original performance model with current flight parameters.

22. The aircraft performance analysis method of claim 14, further comprising updating, by the performance analysis control unit, the current performance model in response to each flight of the aircraft.

23. An aircraft performance analysis system, comprising:
- an original performance model database storing original performance model data regarding an original performance model determined through one or more flight tests;
- a current performance model database; and
- a performance analysis control unit in communication with the original performance model database and the current performance model database, wherein the performance analysis control unit:
  - receives the original performance model data regarding the original performance model for the aircraft,
  - receives flight data from a flight computer of the aircraft, and
  - determines a current performance model for the aircraft based on the original performance model data and the flight data, wherein the current performance model is indicative of a current operational status of the aircraft, and wherein the current performance model is stored as current performance model data within the current performance model database.

\* \* \* \* \*